United States Patent
Agapiou et al.

(10) Patent No.: US 6,245,868 B1
(45) Date of Patent: Jun. 12, 2001

(54) CATALYST DELIVERY METHOD, A CATALYST FEEDER AND THEIR USE IN A POLYMERIZATION PROCESS

(75) Inventors: Agapios K. Agapiou, Humble; Kathryn A. Russell, Seabrook, both of TX (US)

(73) Assignee: Univation Technologies, Houston, TX (US)

( * ) Notice: Subject to any disclaimer, the term of this patent is extended or adjusted under 35 U.S.C. 154(b) by 0 days.

(21) Appl. No.: 09/087,024

(22) Filed: May 29, 1998

(51) Int. Cl.[7] ................... C08F 2/34; C08F 2/14
(52) U.S. Cl. ................... 526/88; 526/68; 526/74; 526/160; 526/209; 526/211; 526/348; 526/348.5; 526/901; 524/855
(58) Field of Search ............ 526/74, 160, 170, 526/901, 68, 209, 88, 211, 348, 348.5; 524/855

(56) References Cited

U.S. PATENT DOCUMENTS

| | | |
|---|---|---|
| 3,779,712 | 12/1973 | Calvert et al. ............ 23/288 |
| 5,026,795 | 6/1991 | Hogan . |
| 5,034,480 | 7/1991 | Funk et al. . |
| 5,034,481 | 7/1991 | Funk et al. . |
| 5,410,002 | 4/1995 | Govoni et al. . |
| 5,462,999 | * 10/1995 | Griffin et al. ............ 526/88 X |
| 6,022,935 | * 2/2000 | Fischer et al. ............ 526/901 |

FOREIGN PATENT DOCUMENTS

| | | |
|---|---|---|
| 19615953 A1 | 10/1997 | (DE) . |
| 453116 B1 | 10/1991 | (EP) . |
| 0 459 300 A1 | 7/1992 | (EP) . |
| 0 776 691 A1 | 6/1997 | (EP) . |
| 97-514571 | 10/1997 | (EP) . |
| 0 810 233 A2 | 12/1997 | (EP) . |
| 811638 A2 | 12/1997 | (EP) . |
| WO 96/11960 | 4/1996 | (WO) . |
| WO 96/11961 | 4/1996 | (WO) . |
| WO 97/46599 | 12/1997 | (WO) . |
| WO 98/20045 | 5/1998 | (WO) . |
| WO 98/37102 | 8/1998 | (WO) . |

* cited by examiner

*Primary Examiner*—Fred Teskin
(74) *Attorney, Agent, or Firm*—Jaimes Sher; Lisa Kimes Jones (57) ABSTRACT

The present invention relates to an improved catalyst delivery method for introducing a supported bulky ligand metallocene-type catalyst system to a reactor for polymerizing one or more olefin(s). In particular, the invention provides for a method of introducing a supported metallocene-type catalyst system into a polymerization reactor by and in the presence of a carrier solution of an antistatic agent and a liquid diluent. Also, the invention is directed toward a catalyst feeder for use in a polymerization process.

56 Claims, 1 Drawing Sheet

*Figure 1*

CATALYST DELIVERY METHOD, A CATALYST FEEDER AND THEIR USE IN A POLYMERIZATION PROCESS

FIELD OF THE INVENTION

The present invention relates to an improved catalyst delivery method for introducing a supported bulky ligand metallocene-type catalyst system to a reactor for polymerizing one or more olefin(s). Also, the invention relates to an improved catalyst feeder for introducing a catalyst into a polymerization reactor.

BACKGROUND OF THE INVENTION

The use of bulky ligand metallocene-type catalyst systems in polymerization processes to produce a diverse array of new polymers for use in a wide variety of applications and products is well known in the art. Typical bulky ligand metallocene-type compounds are generally described as containing one or more ligands capable of η-5 bonding to the transition metal atom, usually, cyclopentadienyl derived ligands or moieties, in combination with a transition metal selected from Group 4, 5 or 6 or from the lanthanide and actinide series of the Periodic Table of Elements. Exemplary of the development of these and other metallocene-type catalyst compounds and catalyst systems are described in U.S. Pat. Nos. 5,017,714, 5,055,438, 5,096,867, 5,198,401, 5,229,478, 5,264,405, 5,278,119, 5,324,800, 5,384,299, 5,408,017, 5,491,207 and 5,621,126 all of which are herein fully incorporated by reference.

It is also well known that these bulky ligand metallocene-type catalyst systems have a tendency toward fouling and/or sheeting, particularly when they are supported on a carrier, and especially when used in a gas or slurry polymerization process.

For example, in a continuous slurry process fouling on the walls of the reactor, which acts as heat transfer surface, can result in many problems. Poor heat transfer during polymerization can result in polymer particles adhering to the walls of the reactor, where they can continue to polymerize. This can be detrimental to the process and can result in premature reactor shutdown. Also, depending upon the reactor conditions, some of the polymer may dissolve in the reactor diluent and redeposit on for example the metal heat exchanger surfaces.

In a continuous gas phase process for example, a continuous recycle stream is employed The recycle stream composition is heated by the heat of polymerization, and in another part of the cycle, heat is removed by a cooling system external to the reactor. Fouling in a continuous gas phase process can lead to the ineffective operation of various reactor systems. For example, the cooling system, temperature probes and the distributor plate, which are often employed in a gas phase fluidized bed polymerization process can be affected. These upsets can lead to an early reactor shutdown.

Another major problem associated primarily with fluid bed gas phase operation involves "sheeting" in the reactor. This is particularly problematic with bulky ligand metallocene-type catalysts because of their very high activity on a per gram of metal basis that often results in the generation of extreme heat local to the growing polymer particle. Also, the polymer produced with these bulky ligand metallocene-type catalysts are very tough, making the molten sheet that may form in the reactor difficult to break-up and remove from the reactor. Another problem associated with using a supported bulky ligand metallocene-type catalysts is that often there is a partial or complete pluggage of the catalyst delivery tube used to introduce the supported catalyst into the reactor. This pluggage phenomenon is particularly a problem when using very high activity, a high comonomer incorporating supported bulky ligand metallocene-type catalyst system.

As a result of the reactor operability issues associated with using supported bulky ligand metallocene-type catalysts and catalyst systems various techniques have been developed that are said to result in improved operability.

For example, various supporting procedures or methods for producing a metallocene-type catalyst system with reduced tendencies for fouling and better operability have been discussed in the art. U.S. Pat. No. 5,283,218 is directed towards the prepolymerization of a metallocene catalyst. U.S. Pat. Nos. 5,332,706 and 5,473,028 have resorted to a particular technique for forming a catalyst by "incipient impregnation". U.S. Pat. Nos. 5,427,991 and 5,643,847 describe the chemical bonding of non-coordinating anionic activators to supports. U.S. Pat. No. 5,492,975 discusses polymer bound metallocene-type catalyst systems. U.S. Pat. No. 5,661,095 discusses supporting a metallocene-type catalyst on a copolymer of an olefin and an unsaturated silane. PCT publication WO 97/06186 published Feb. 20, 1997 teaches removing inorganic and organic impurities after formation of the metallocene-type catalyst itself. PCT publication WO 97/15602 published May 1, 1997 discusses readily supportable metal complexes. PCT publication WO 97/27224 published Jul. 31, 1997 relates to forming a supported transition metal compound in the presence of an unsaturated organic compound having at least one terminal double bond.

Others have discussed different process modifications for improving operability with metallocene-type catalysts and conventional Ziegler-Natta catalysts. For example, PCT publication WO 97/14721 published Apr. 24, 1997 discusses the suppression of fines that can cause sheeting by adding an inert hydrocarbon to the reactor. U.S. Pat. No. 5,627,243 discusses a new type of distributor plate for use in fluidized bed gas phase reactors. PCT publication WO 96/08520 discusses avoiding the introduction of a scavenger into the reactor. U.S. Pat. No. 5,461,123 discusses using sound waves to reduce sheeting. U.S. Pat. No. 5,066,736 and EP-A1 0 549 252 discuss the introduction of an activity retarder to the reactor to reduce agglomerates. U.S. Pat. No. 5,610,244 relates to feeding make-up monomer directly into the reactor above the bed to avoid fouling and improve polymer quality. U.S. Pat. No. 5,126,414 discusses including an oligomer removal system for reducing distributor plate fouling and providing for polymers free of gels. EP 0 453 116 A1 published Oct. 23, 1991 discusses the introduction of antistatic agents to the reactor for reducing the amount of sheets and agglomerates. U.S. Pat. No. 4,012,574 discusses adding a surface-active compound, a perfluorocarbon group to the reactor to reduce fouling. WO 96/11961 published Apr. 26, 1996 discusses as a component of a supported catalyst system an antistatic agent for reducing fouling and sheeting in a gas, slurry or liquid pool polymerization process. U.S. Pat. 5,026,795 discusses the addition of an antistatic agent with a liquid carrier to the polymerization zone in the reactor. U.S. Pat. No. 5,410,002 discusses using a conventional Ziegler-Natta titanium/magnesium supported catalyst system where a selection of antistatic agents are added to directly to the reactor to reduce fouling. U.S. Pat. Nos. 5,034,480 and 5,034,481 discuss a reaction product of a conventional Ziegler-Natta titanium catalyst with an antistat to product ultrahigh molecular weight ethylene polymers.

There are various other known methods for improving operability including coating the polymerization equipment, injecting various agents into the reactor, controlling the polymerization rate, particularly on start-up, and reconfiguring the reactor design.

While all these possible solutions might reduce fouling or sheeting somewhat, some are expensive to employ and/or may not reduce both fouling and sheeting to a level sufficient for the successful operation of a continuous process, particularly in a commercial or large-scale process with supported bulky ligand metallocene-type catalysts.

PCT Publication WO 97/46599 published Dec. 11, 1997 relates to the use of soluble matallocene catalysts in a gas phase process utilizing soluble metallocene catalysts that are fed into a lean zone in a polymerization reactor to produce stereoregular polymers. This PCT publication generally mentions that the catalyst feedstream can contain antifoulants or antistatic agents such as ATMER 163 (available from ICI Specialty Chemicals, Baltimore, Md.).

EP-A2-811 638 discusses using a metallocene catalyst and an activating cocatalyst in a polymerization process in the presence of a nitrogen containing antistatic agent. This European publication mentions various methods for introducing the antistatic agent, most preferably the antistatic agent is sprayed into the fluidized bed of the reactor. Another method generally discussed is the adding of an antistatic agent with the supported or liquid catalyst stream so long as the catalysts are not severely affected or poisoned by the antistatic agent. In the examples the supported catalysts were slurried in mineral oil prior to being introduced to the reactor and in the examples using the unsupported catalysts, the antistatic agent was introduced directly to the reactor.

Thus, it would be advantageous to have a polymerization process capable of operating continuously with enhanced reactor operability while at the same time producing polymers having improved physical properties. It would also be highly advantageous to have a continuously operating polymerization process having more stable catalyst productivities and reduced fouling/sheeting tendencies and increased duration of operation.

SUMMARY OF THE INVENTION

This invention provides for an improved method for delivering a supported bulky ligand metallocene-type catalyst system to a reactor for use in the polymerization of olefin(s).

The invention more particularly provides for a method for delivering a supported bulky ligand metallocene-type catalyst system to a gas or slurry phase polymerization reactor utilizing a carrier solution comprising an antistatic agent and a liquid diluent, wherein the carrier solution serves to flush the supported bulky ligand metallocene-type catalyst system into the reactor.

In another embodiment, the invention provides for a gas or slurry phase process for polymerizing olefin(s) in a reactor in the presence of a supported bulky ligand metallocene-type catalyst system, wherein the supported bulky ligand metallocene-type catalyst system is introduced to the reactor by a carrier solution, the carrier solution comprising an antistatic agent and a liquid diluent.

In yet another embodiment, the invention provides for a polymerization catalyst composition of a preformed and substantially dried supported bulky ligand metallocene-type catalyst system and a carrier solution comprising an antistatic agent and a liquid diluent. The invention also provides for the use of the polymerization catalyst composition in a polymerization process of olefin(s).

In another embodiment, the invention provides for a new and improved catalyst feeder for use in combination with a reactor vessel having within the reactor vessel a reaction zone, the catalyst feeder comprising a catalyst vessel for containing a polymerization catalyst, the catalyst vessel connected to a catalyst injection tube for delivering the polymerization catalyst to the reaction zone, the catalyst injection tube being disposed within a support tube that protrudes through the polymerization reactor wall into the reaction zone, and the catalyst feeder further comprising a means for contacting the polymerization catalyst with a carrier solution comprising an antistatic agent and a liquid diluent prior to the polymerization catalyst entering the reaction zone.

BRIEF DESCRIPTION OF THE DRAWINGS

The foregoing aspects, features and advantages of the invention will become clearer and more fully understood when the following detailed description is read in conjunction with the accompanying drawing, in which.

DETAILED DESCRIPTION OF THE INVENTION

Introduction

The invention is directed toward an improved method for delivering to a polymerization reactor a supported bulky ligand metallocene-type catalyst system. It has been discovered that the method by which the supported bulky ligand metallocene-type catalyst is introduced into a reactor can affect the operability of a polymerization process. Much of the art discusses the introduction of an antistatic agent directly to the reactor to reduce static build-up, reduce fouling and sheeting, and eliminate hot spots throughout the reactor system. Others in the art have discussed methods of producing a supported catalyst system with an antistatic agent as part of the method of making the supported catalyst system. These methods however do not completely eliminate sheeting or plugging of the catalyst feed tubes, particularly when using highly active bulky ligand metallocene-type catalyst systems. The surprising benefits attributable to the method of delivering a supported bulky ligand metallocene-type catalyst system has been discovered.

It has been discovered that the delivery of a supported metallocene-type catalyst system using an inert gas, by itself, such as nitrogen can result in operability problems, such as fouling at the tip of a catalyst injection tube. This type of tip fouling results in a poor and uneven catalyst flow rate into the reactor, reduced catalyst efficiency and reduced particle morphology. As a result of this form of fouling, during a polymerization process, the catalyst injection tube must be cleared or replaced Either partial or complete pluggage of the catalyst injection tube requires constant monitoring of the condition of the catalyst injection tube. Often this type of fouling will result in a polymer agglomeration at the tip of the catalyst injection tube resulting in partial or complete blockage. Also, the agglomeration is difficult in many instances to dislodge, and even if cleared, the agglomeration has no where else to go but into the reactor and may further hinder the operability of the process.

It has been surprisingly discovered that utilizing a carrier solution of an antistatic agent and a liquid diluent in which a preformed supported bulky ligand metallocene-type catalyst system is contacted, results in better process operability. In fact, delivery of the supported bulky ligand metallocene-type catalyst system is more uniform, catalyst efficiency is improved, and particle morphology is better. Even more importantly, plugging of the catalyst injection tube is substantially reduced or eliminated. In commercial operations where the supported catalyst system is introduced continuously, this plugging phenomenon is easily recognizable. However, plugging is not a major concern in small or lab-scale reactors because typically catalyst is introduced as a one-time slug. The method for delivery of the invention is particularly well suited to bulky ligand metallocene-type catalyst compounds that tend to be highly incorporating of comonomer. Also, it was suprising that using the method of the invention fractional melt index and higher density polymers may be produced in a polymerization process having improved operability.

Catalyst Components and Catalyst Systems

Generally, bulky ligand transition metallocene-type catalyst compounds include half and full sandwhich compounds having one or more bulky ligands including cyclopentadienyl structures or other similar functioning structure such as pentadiene, cyclooctatetraendiyl and imides. The bulky ligands are capable of η-5 bonding to a transition metal atom, for example from Group 4, 5 and 6 of the Periodic Table of Elements. Non-limiting examples of catalyst components and catalyst systems are discussed in for example, U.S. Pat. Nos. 4,530,914, 4,871,705, 4,937,299, 5,124,418, 5,017,714, 5,120,867, 5,210,352, 5,278,264, 5,278,119, 5,304,614, 5,324,800, 5,347,025, 5,350,723, 5,391,790, 5,391,789, 5,399,636, 5,539,124, 5,455,366, 5,534,473, 5,684,098, 5,693,730, 5,698,634, 5,710,297, 5,712,354, 5,714,427, 5,714,555, 5,728,641, 5,728,839 and 5,753,577 all of which are herein fully incorporated by reference. Also, the disclosures of European publications EP-A-0 591 756, EP-A-0 520 732, EP-A- 0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455 and WO 98/06759 are all herein fully incorporated by reference for purposes of describing typical bulky ligand transition metal metallocene-type catalyst compounds and catalyst systems.

Bulky Ligand Metallocene-Type Catalyst Compounds

Typical bulky ligand metallocene-type catalyst compounds of the invention are represented by the formula:

$$L^A L^B MQ \qquad (I)$$

where M is a metal from the Periodic Table of the Elements and may be a Group 3 to 10 metal, preferably, a Group 4, 5 or 6 transition metal or a metal from the lanthanide or actinide series, more preferably M is a transition metal from Group 4, even more preferably zirconium, hafnium or titanium. $L^A$ and $L^B$ are bulky ligands that include cyclopentadienyl derived ligands or substituted cyclopentadienyl derived or heteroatom substituted cyclopentadienyl derived ligands or hydrocarbyl substituted cyclopentadienyl derived ligands or moieties such as indenyl ligands, a benzindenyl ligands or a fluorenyl ligands, an octahydrofluorenyl ligands, a cyclooctatetraendiyl ligands, an azenyl ligands and the like, including hydrogenated versions thereof. Also, $L^A$ and $L^B$ may be any other ligand structure capable of η-5 bonding to M, for example $L^A$ and $L^B$ may comprises one or more heteroatoms, for example nitrogen, silicon, germanium, and phosphorous, in combination with carbon atoms to form a cyclic structure, for example a heterocyclopentadienyl ancillary ligand. Further, each of $L^A$ and $L^B$ may also be other types of bulky ligands including but not limited to bulky amides, phosphides, alkoxides, aryloxides, imides, carbolides, borollides, porphyrins, phthalocyanines, corrins and other polyazomacrocycles. Each $L^A$ and $L^B$ may be the same or different type of bulky ligand that is π-bonded to M.

Each $L^A$ and $L^B$ may be substituted with a combination of substituent groups R. Non-limiting examples of substituent groups R include hydrogen or linear, branched, alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, iso propyl etc. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis (difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide, ethylsulfide. Non-hydrogen substituents R include the atoms carbon, silicon, nitrogen, oxygen, tin, germanium and the like including olefins such as but not limited to olefinically unsaturated substituents including vinyl-terminated ligands, for example but-3-enyl or hexene-1. Also, two adjacent R groups are joined to form a ring structure having from 4 to 20 atoms selected from carbon, nitrogen, oxygen, phosphorous, silicon, germanium, boron or a combination thereof.

Other ligands may be bonded to the transition metal, such as a leaving group Q. Q may be an independently monoanionic labile ligands having a sigma-bond to M. Non-limiting examples of Q include weak bases such as amines, phosphines, ether, carboxylates, dienes, hydrocarbyl radicals having from 1 to 20 carbon atoms, hydrides or halogens and the like. Other examples of Q radicals include those substituents for R as described above and including cyclohexyl, heptyl, tolyl, trifluromethyl, tetramethylene and pentamethylene, methylidene, methyoxy, ethyoxy, propoxy, phenoxy, bis(N-methylanilide), dimethylamide, dimethylphosphide radicals and the like.

In addition, bulky ligand metallocene-type catalyst compounds of the invention are those where $L^A$ and $L^B$ are bridged to each other by a bridging group, A. Non-limiting examples of bridging group A include bridging radicals of at least one Group 14 atom, such as but not limited to carbon, oxygen, nitrogen, silicon, germanium and tin, preferably carbon, silicon and germanium, most preferably silicon. Other non-limiting examples of bridging groups A include dimethylsilyl, diethylsilyl, methylethylsilyl, trifluoromethylbutylsilyl, bis(trifluoromethyl)silyl, di-n-butylsilyl, silylcyclobutyl, di-i-propylsilyl, di-cyclohexylsilyl, di-phenylsilyl, cyclohexylphenylsilyl, t-butylcyclohexylsilyl, di-t-butylphenylsilyl, di(p-tolyl)silyl, dimethylgermyl, diethylgermyl, methylene, dimethylmethylene, diphenylmethylene, ethylene, 1-2-dimethylethylene, 1,2-diphenylethylene, 1,1,2,2-tetramethylethylene, dimethylmethylenedimethylsilyl, methylenediphenylgermyl, methylamine, phenylamine, cyclohexylamine, methylphosphine, phenylphosphine, cyclohexylphosphine and the like.

In one embodiment, the bulky ligand metallocene-type catalyst compound of the invention is represented by the formula:

$(C_5H_{4-d}R_d)A_x(C_5H_{4-d}R_d)M\ Qg_{-2}$            (II)

wherein M is a Group 4, 5, 6 transition metal, $(C_5H_{4-d}R_d)$ is an unsubstituted or substituted cyclopentadienyl derived bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of carbon, germanium, silicon, tin, phosphorous or nitrogen atom containing radical bridging two $(C_5H_{4-d}dR_d)$ rings; more particularly, non-limiting examples of A may be represented by R'$_2$C, R'$_2$2Si, R'$_2$Si R'$_2$Si, R'$_2$Si R'$_2$C, R'$_2$Ge, R'$_2$Ge, R'$_2$Si R'$_2$Ge, R'$_2$GeR R'$_2$C, R'N, R'P, R'$_2$C R'N, R'$_2$C R'P, R'$_2$Si R'N, R'$_2$Si R'P, R'$_2$GeR'N, R'$_2$Ge R'P, where R' is independently, a radical group which is hydride, $C_{1-30}$ hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen; each Q which can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclometallated hydrocarbyl ligand or other divalent anionic chelating ligand, where g is an integer corresponding to the formal oxidation state of M, and d is an integer selected from the 0, 1, 2, 3 or 4 and denoting the degree of substitution and x is an integer from 0 to 1.

In one embodiment, the bulky ligand metallocene-type compounds are those where the R substituents on the bulky ligands $L^A$, $L^B$, $(C_5H_{4-d}R_d)$ of formulas (I) and (II) are substituted with the same or different number of substituents on each of the bulky ligands.

Other metallocene-type catalysts useful in the invention include monocyclopentadienyl heteroatom containing metallocene-type compounds. These types of catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference. Other catalysts useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401 and 5,723,398 and PCT publications WO 93/08221, WO 93/08199, WO 95/07140, WO 98/11144 and European publications EP-A-0 578 838, EP-A-0 638 595, EP-B-0 513 380 and EP-A1-0 816 372, all of which are herein fully incorporated by reference.

In another embodiment of this invention the monocyclopentadienyl metallocene-type catalyst compounds useful in the invention are represented by the formula:

(III)

wherein

M is Ti, Zr or Hf; $(C_5H_{5-y-x}R_x)$ is a cyclopentadienyl ring which is substituted with from 0 to 5 substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen atom, $C_1$–$C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1$–$C_{20}$ hydrocarbyl radicals wherein one or more hydrogen atoms is replaced by a halogen atom, y is 0 or 1, and "z" is the coordination number of the element J;

each Q is, independently, any univalent anionic ligand such as halogen, hydride, or substituted or unsubstituted $C_1$–$C_{30}$ hydrocarbyl, alkoxide, aryloxide, amide or phosphide, provided that two Q may be an alkylidene, a cyclometallated hydrocarbyl or any other divalent anionic chelating ligand; and n may be 0,1 or 2;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R,R' or Q and n is 0, 1, 2 or 3.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 both of which are herein fully incorporated by reference. Preferably, the bulky ligand type metallocene-type catalyst compound, the monocycloalkadienyl catalyst compound, may be represented by one of the following formulas:

(IV)

or (V)

wherein M is a transition metal from Group 4, 5 or 6, preferably titanium zirconium or hafnium, most preferably zirconium or hafnium; L is a substituted or unsubstituted, pi-bonded ligand coordinated to M, preferably L is a cycloalkadienyl bulky ligand, for example cyclopentadienyl, indenyl or fluorenyl bulky ligands, optionally with one or more hydrocarbyl substituent groups having from 1 to 20 carbon atoms; each Q is independently selected from the group consisting of —O—, —NR—, —CR$_2$— and —S—, preferably oxygen; Y is either C or S, preferably carbon; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$; n is 1 or 2, preferably 1; A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent; and T is a bridging group selected from the group consisting of alkylene and arylene groups containing from 1 to 10 carbon atoms optionally substituted with carbon or heteroatoms, germanium, silicone and alkyl phosphine; and m is 2 to 7, preferably 2 to 6, most preferably 2 or 3.

In formulas (IV) and (V), the supportive substituent formed by Q, Y and Z is a unicharged polydentate ligand exerting electronic effects due to its high polarizability, similar to the cyclopentadienyl ligand. In the most preferred embodiments of this invention, the disubstituted carbamates and the carboxylates are employed. Non-limiting examples of monocycloalkadienyl catalyst compounds include indenyl zirconium tris(diethylcarbamate), indenyl zirconium tris (trimethylacetate), indenyl zirconium tris(p-toluate), indenyl zirconium tris(benzoate), (1-methylindenyl)zirconium tris (trimethylacetate), (2-methylindenyl) zirconium tris (diethylcarbamate), (methylcyclopentadienyl) zirconium tris(trimethylacetate), cyclopentadienyl tris (trimethylacetate), tetrahydroindenyl zirconium tris (trimethylacetate), and (pentamethylcyclopentadienyl) zirconium tris(benzoate). Preferred examples are indenyl zirconium tris(diethylcarbamate), indenyl zirconium tris (trimethylacetate), and (methylcyclopentadienyl) zirconium tris(trimethylacetate).

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202 herein incorporated by reference.

It is contemplated in some embodiments, that the bulky ligands of the metallocene-type catalyst compounds of the invention described above are asymmetrically substituted in terms of additional substituents or types of substituents, and/or unbalanced in terms of the number of additional substituents on the bulky ligands or the bulky ligands themselves are different. It is also contemplated that in one embodiment, the metallocene-type catalysts of the invention include their structural or optical or enantiomeric isomers and mixtures thereof. In another embodiment the bulky ligand metallocene-type compounds of the invention may be chiral and/or a bridged bulky ligand metallocene-type catalyst compound.

It is also within the scope of this invention that the above described bulky ligand metallocene-type catalyst compounds can be combined with one or more of the catalyst compounds represented by formula (I), (II), (III), (IV) and (V) with one or more activators or activation methods described below.

Activator and Activation Methods

The above described bulky ligand metallocene-type catalyst compounds of the invention are typically activated in various ways to yield catalyst compounds having a vacant coordination site that will coordinate, insert, and polymerize olefins.

For the purposes of this patent specification and appended claims, the term "activator" is defined to be any compound or component or method which can activate any of the bulky ligand metallocene-type catalyst compounds of the invention as described above. Non-limiting activators, for example may include a Lewis acid or a non-coordinating ionic activator or ionizing activator or any other compound that can convert a neutral bulky ligand metallocene-type catalyst component to a bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron or a trisperfluorophenyl boron metalloid precursor that would ionize the neutral metallocene compound.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, PCI publications WO 94/07928 and WO 95/14044 and U.S. Pat. Nos. 5,153,157 and 5,453,410 all of which are herein fully incorporated by reference. Also, methods of activation such as using radiation (see EP-B1-0 615 981 herein incorporated by reference) and the like are also contemplated as activating methods for the purposes of rendering the neutral bulky ligand metallocene-type catalyst compound or precursor to a metallocene-type cation capable of polymerizing olefins.

It is further contemplated by the invention that other catalysts can be combined with the bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference.

In another embodiment of the invention the bulky ligand metallocene-type catalyst compounds of the invention may be used in combination with a non-metallocene or traditional Ziegler-Natta catalyst (excludes a cyclopentadienyl containing moiety) or catalyst system, or chromium based catalysts or catalyst systems, non-limiting examples are described in U.S. Pat. Nos. 4,159,965, 4,325,837, 4,701,432, 5,124,418, 5,077,255, 5,183,867, 5,391,660, 5,395,810, 5,691,264 and 5,723,399 and PCT Publication WO 96/23010 published Aug. 1, 1996 all of which are herein fully incorporated by reference.

Supporting Methods

It is also within the scope of this invention that the above described bulky ligand metallocene-type catalyst compounds can be combined with one or more support materials using one of the support methods described below. In the preferred embodiment, the bulky ligand metallocene-type catalyst systems of the invention are in a supported form, for example deposited on, contacted with, or incorporated within, a support material.

The terms "support" is any support material, preferably a porous support material, for example, talc, inorganic oxides, inorganic chlorides, and magnesium chloride, and resinous support materials such as polystyrene or a functionalized organic support or crosslinked organic support such as polystyrene divinyl benzene polyolefins or polymeric compounds, or any other organic or inorganic support material and the like, or mixtures thereof.

The preferred support materials are inorganic oxide materials, which include those of Groups 2, 3, 4, 5, 13 or 14 metal oxides. In a preferred embodiment, the mixed metallocene-type catalyst support materials include silica, alumina, silica-alumina, and mixtures thereof. Other inorganic oxides that may be employed either alone or in combination with the silica, alumina or silica-alumina, and magnesia, titania, zirconia, montmorillonite and the like or combination thereof, for example, silica-chromium, silica-titania.

It is preferred that the carrier of the bulky ligand metallocene-type catalysts of this invention, preferably an inorganic oxide, has a surface area in the range of from about 10 to about 700 $m^2/g$, pore volume in the range of from about 0.1 to about 4.0 cc/g and average particle size in the range of from about 10 to about 500 $\mu m$. More preferably, the surface area is in the range of from about 50 to about 500 $m^2/g$, pore volume of from about 0.5 to about 3.5 cc/g and average particle size of from about 20 to about 200 $\mu m$. Most preferably the surface area range is from about 100 to about 400 $m^2/g$, pore volume from about 0.8 to about 3.0 cc/g and average particle size is from about 20 to about 100 $\mu m$. The average pore size of the carrier of the invention typically has pore size in the range of from 10 to 1000Å, preferably 50 to about 500Å, and most preferably 75 to about 350Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402 and 5,731,261 and U.S. application Ser. Nos. 271,598 filed Jul. 7, 1994, U.S. Pat. Nos. 5,468,702 and 788,736 filed Jan. 23, 1997, U.S. Pat. No. 6,090,740 and PCT publications WO 95/32995, WO 95/14044, WO 96/06187 and WO 97/02297 all of which are herein fully incorporated by reference.

It has also been discovered that utilizing the catalyst delivery method of the invention, smaller particle size support materials may be used. For example, silica having an average particle size from about 10 microns to 80 microns. Silica materials of this size are available from Crosfield, Manchester, England, for example Crosfield ES-70 having an average particle size of 40 microns.

It is contemplated that the bulky ligand metallocene-type catalyst compounds of the invention may be deposited on the same or separate supports together with an activator, or the activator may be used in an unsupported form, or may be deposited on a support different from the supported bulky ligand metallocene-type catalyst compounds of the invention, or any combination thereof.

In another embodiment, the bulky ligand metallocene-type catalyst compound of the invention contains a polymer bound ligand as described in U.S. Pat. No. 5,473,202 which is herein fully incorporated by reference. In one embodiment the bulky ligand metallocene-type catalyst system of the invention is spray dried as described in U.S. Pat. No. 5,648,310 which is fully incorporated herein by reference. In an embodiment the support used with the bulky ligand metallocene-type catalyst system of the invention is functionalized as described in European publication EP-A-0 802 203, or at least one substituent or leaving group is selected as described in U.S. Pat. No. 5,688,880, both of which are herein fully incorporated by reference.

In another embodiment, the invention provides for a supported bulky ligand metallocene-type catalyst system that includes an antistatic agent or surface modifier in the preparation of the supported catalyst system, as described in PCT publication WO 96/11960 which is herein fully incorporated by reference.

A preferred method for producing the supported bulky ligand metallocene-type catalyst system of the invention is described below and can be found in U.S. application Ser. Nos. 265,533, filed Jun. 24, 1994 ABN and 265,532, filed Jun. 24, 1994 ABN and PCT publications WO 96/00245 and WO 96/00243 both published Jan. 4, 1996, all of which are herein fully incorporated by reference.

In a preferred embodiment, the bulky ligand metallocene-type catalyst compound is slurried in a liquid to form a metallocene solution and a separate solution is formed containing an activator and a liquid. The liquid can be any compatible solvent or other liquid capable of forming a solution or the like with at least one of the bulky ligand metallocene-type catalyst compounds of the invention and/or at least one activator. In the preferred embodiment the liquid is a cyclic aliphatic or aromatic hydrocarbon, most preferably toluene. The bulky ligand metallocene-type catalyst compound and activator solutions are mixed together and added to a porous support or the porous support is added to the solutions such that the total volume of the bulky ligand metallocene-type catalyst compound solution and the activator solution or the bulky ligand metallocene-type catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration,* Vol. 28, No. 3, Analytical Chemistry 332–334 (March, 1956).

The mole ratio of the metal of the activator component to the metal of the bulky ligand metallocene-type catalyst compounds are in the range of ratios between 0.3:1 to 1000:1, preferably 20:1 to 800:1, and most preferably 50:1 to 500: 1. Where the activator is an aluminum-free ionizing activator such as those based on the anion tetrakis (pentafluorophenyl)boron, the mole ratio of the metal of the activator component to the metal component is preferably in the range of ratios between 0.3:1 to 3:1.

In one embodiment of the process of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system of the invention prior to the main polymerization. The prepolymerization can be carried out batchwise or continuously in gas, solution or slurry phase including at elevated pressures. The prepolymerization can take place with any alphaolefin monomer or combination and/or in the presence of any molecular weight controlling agent such as hydrogen. For examples of prepolymerization procedures, see U.S. Pat. Nos. 4,923,833, 4,921,825, 5,283,278 and 5,705,578 and European publication EP-B-0279 863 and PCT Publication WO 97/44371 all of which are herein fully incorporated by reference.

Antistatic Agents

For the purposes of this patent specification and appended claims the term "antistatic agent" is any organic compound containing at least one electron rich heteroatom from Groups IV, V and/or VI and a hydrocarbyl moiety. Non-limiting examples of typical heteroatoms include silicon, oxygen, nitrogen, phosphorus, and sulfur. The antistatic agent should also contain at least one active hydrogen atom attached to the heteroatom. It is preferable that the hydrocarbyl moiety should have a molecular weight sufficient to give it solubility in typical hydrocarbon solvents, such as, for example a cyclic aliphatic or aromatic hydrocarbon, for example toluene.

The antistatic agent may be represented by the formula, $R_m X R'_n$, where R is a branched or straight chain hydrocarbyl group or substituted hydrocarbyl group or groups having one or more carbon atoms, R' is an alkyl hydroxy group such as —$CH_2CH_2OH$, X is at least one heteroatom, which are O, N, P or S atoms or a combination thereof; and n is such that the formula has no net charge.

Non limiting examples of the following general structures with R being the hydrocarbyl groups are: $RNH_2$, $R_2NH$, $(R'C(OH)_nR'')NH_2$, $(R'C(OH)_nR'')_2NH$, $RCONH_2$, $RCONHR$, $RN(ROH)_2$, $RCO_2H$, $RC(O)NROH$, $RC(S)OH$, and $R_2PO_2H$. These compounds include amines, alcohols, phenols, thiols, silanols, diols, acids, and ethers.

In another embodiment the antistatic agent of this invention can be expressed by the formula:

where $R^3$ is hydrogen or a branched or preferably a straight chain alkyl group having 1 to 50 carbon atoms. $R^1$ and $R^2$ can be the same or different and could be the same as $R^3$ or contain another heteroatom such as O, N, P or S.

In another embodiment, the antistatic agent is represented by the following formula for a hydroxy containing alkyl tertiary amine:

where $R^1$ can be hydrogen or a (linear or branched) alkyl group of from 1 to 50 carbon atoms, preferably greater than 12 carbon atoms; $R^2$ can be a hydroxy group such a $(CH_2)_xOH$ radical where x is an integer from 1 to 50, preferably 2 to 25. Non-limiting examples include Kemamine AS-990 (available from Witco Chemical Corporation, Houston, Tex.) having the formula $C_{18}H_{37}N$ $(CH_2CH_2OH)_2$ and Kemamine AS-650 (also available from Witco) having the formula $C_{12}H_{25}N(CH_2CH_2OH)_2$. Other antistatic agents include bishydroxyethylcocoamine, 2,2-(octadecylamino)bis ethanol, polyoxyethylene alkylamine, butyl stearate, glycerol and SPAN-80 (available from ICI Specialties, Wilmington, Del.) having the formula: $(CH_3)$ $(CH_2)_7CHCH(CH_2)_7OCOCH_2(CHOH)_4CH_2OH$ (sorbitan mono-oleate).

Quaternary ammonium compounds, hydrocarbyl sulfates or phosphates can also be used as antistatic agents. Tertiary amines, ethoxylated amines and polyether compounds are preferable antistatic agents. The antistatic agents may also be synthetically derived or otherwise.

Method of Delivery

The supported bulky ligand metallocene-type catalyst compound or catalyst system is delivered into a polymerization reactor by various known methods in the art. For example, U.S. Pat. No. 4,543,399, which is fully incorporated herein by reference, describes a catalyst feeder mechanism for introducing a catalyst to a reactor. In an embodiment of the invention, the supported metallocene-type catalyst system of the invention may be fed to a reactor in the catalyst feeder mechanism described in PCT publication WO 97/46599, which is fully incorporated herein by reference. Other catalyst feeders useful in the invention include slurry-type feeders, rotary and shot feeders, intermittent and continuous feeders.

The supported bulky ligand metallocene-type catalyst compound or catalyst system is delivered into a polymerization reactor by at least one carrier solution. In another embodiment, the supported bulk ligand metallocene-type catalyst compound or catalyst system is contacted with at least one carrier solution prior to being introduced into the polymerization zone in a polymerization reactor.

In one embodiment of the invention, the supported bulky ligand metallocene-type catalyst system is delivered into the polymerization reactor intermittently or continuously by a carrier solution, preferably the carrier solution is introduced continuously with the supported catalyst system.

In another embodiment of the invention, when transitioning from a first catalyst to a second catalyst, preferably where the first and second catalyst is a bulky ligand metallocene-type catalyst compound, more preferably where the second catalyst is a bridged, bulky ligand metallocene-type catalyst compound, it would be preferable during the transition to use a carrier solution to deliver the second catalyst compound to the polymerization reactor.

In another embodiment of the invention, when starting up a polymerization process the supported bulky ligand metallocene-type catalyst system is initially delivered to the polymerization zone in the reactor by a carrier solution. Once the polymerization process has stabilized, preferably where the process is producing one or more of the desired product (density and/or melt index), the desired production rate and/or the desired catalyst productivity, the supported bulky ligand metallocene-type catalyst system is then introduced to the reactor without a carrier solution, for example with an inert gas such as nitrogen.

The carrier solution includes at least one antistatic agent, examples of which are described above, and a liquid diluent. The liquid diluent may be any liquid capable of maintaining the antistatic agent in substantially, preferably completely, a dissolved state. Examples of liquid diluents include one or more olefin(s) or non-polymerizable hydrocarbons. Non-limiting examples of olefin(s) include those having from 2 to 20 carbon atoms, such as ethylene, propylene, butene-1, 4-methyl-pentene-1, hexene-1 and octene-1. Non-limiting examples of liquid diluents include saturated or unsaturated hydrocarbons. Examples of suitable liquid diluents are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons or mixtures thereof. The preferred hydrocarbons are $C_4$ and $C_6$ saturated hydrocarbons. It is contemplate that other liquid diluents may include cyclic aliphatic or aromatic hydrocarbon, for example toluene. However, one in the art would appreciate using a liquid diluent having no or little effect on the performance of the catalyst.

It is also within the scope of the invention that the carrier solution, in an embodiment, may include an amount of other components such as olefins, diolefins or mixtures thereof.

It is also contemplated that a gas such as nitrogen, ethylene or propylene or the like, preferably an inert gas such as nitrogen may be used in combination with the carrier solution of the invention.

In one embodiment, the carrier solution has in the range of from about 0.01 to about 20 weight percent of an antistatic agent based on the total weight of the carrier solution, more preferably in the range of from 0.01 to 10 weight percent, still more preferably in the range of from 0.1 to about 5 weight percent, and most preferably in the range of from about 0.1 to about 3 weight percent.

It the most preferred embodiment it is best to maintain the carrier solution at a temperature sufficient to keep the antistatic agent in solution, in a dissolved or substantially dissolved state. Thus, in one embodiment, it is preferred to maintain the carrier solution at above 50° C., preferably greater than 60° C. However, one skilled in the art would recognize that it is important not to exceed a temperature that would adversely affect catalyst performance.

In one embodiment the supported bulky ligand metallocene-type catalyst system, preferably where the supported bulky ligand metallocene-type catalyst system is preformed and/or in a dry state, is slurried with a carrier solution prior its introduction into the reactor.

In another embodiment, the carrier solution contains a sufficient amount of an antistatic agent to yield in the range of from 2 to 100 ppm of the antistatic agent based on the bed weight in the reactor, more preferably in the range of from about 5 to 30 ppm, and most preferably in the range of from about 5 to about 20 ppm.

In another embodiment, the carrier solution has an amount of an antistatic agent such that the polymer produced by the process of the invention contains less than 10 ppm antistatic agent, preferably less than 8 ppm.

In one embodiment, the carrier solution is present with the supported bulky ligand metallocene-type catalyst system in an amount such that the antistatic agent is from about 1 weight percent to about 20 weight percent based on the total weight of the catalyst system charged or introduced to the polymerization reactor, preferably from 1 weight percent to about 10 weight percent, most preferably from about 3 weight percent to 8 weight percent.

In yet another embodiment, where an antistatic agent is introduced into the reactor in addition to that which is in the carrier solution, the total amount of antistatic agent used is such that less than 20 ppm antistatic agent, preferably less than 10 ppm antistatic agent is contained in the polymer being produced.

Figure 1:
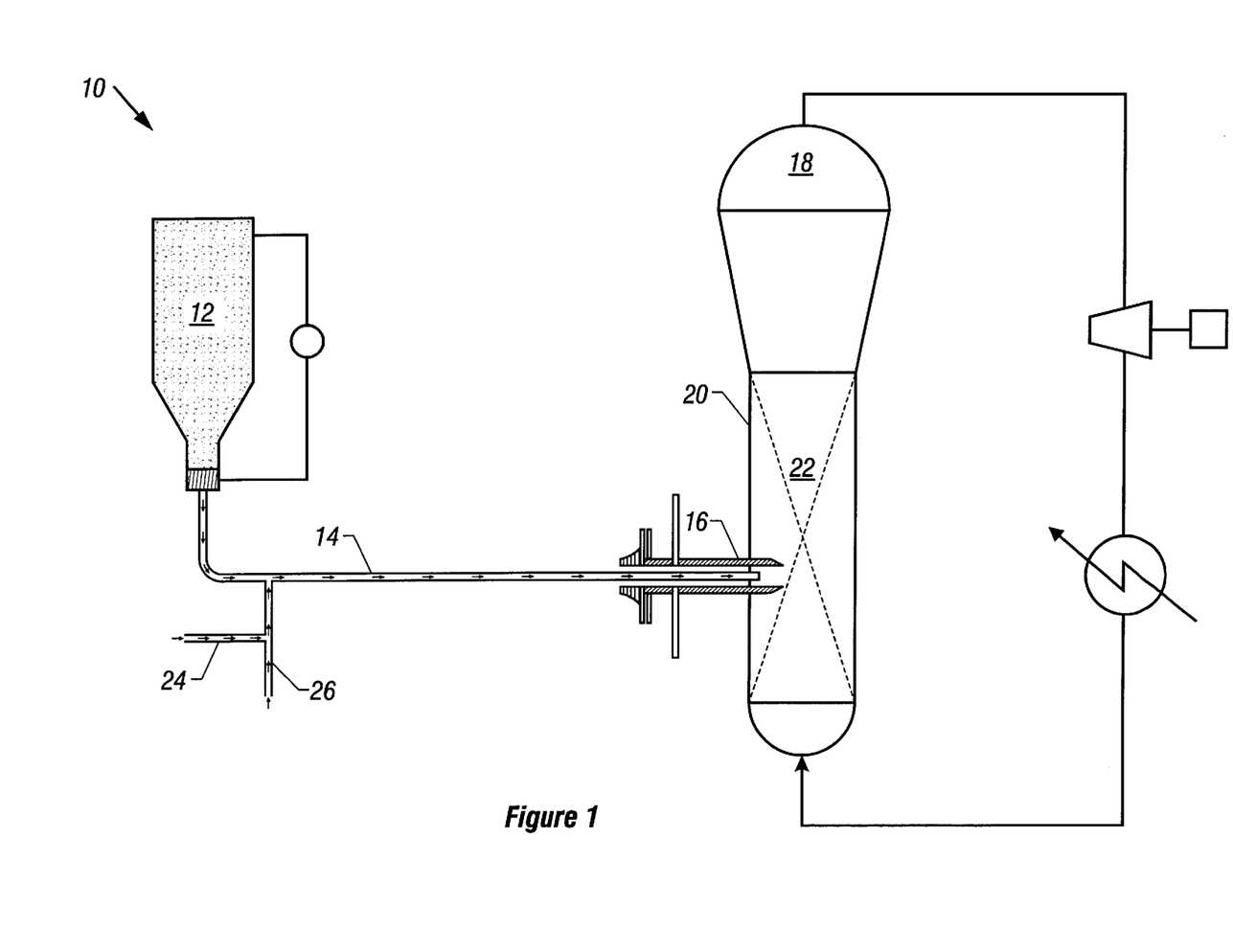
FIG. 1 illustrates the catalyst feeder of the invention.

In one preferred embodiment of the invention a catalyst feeder mechanism, particularly for use in a gas phase polymerization process is shown in FIG. 1. The catalyst feeder (10) includes a catalyst vessel (12) for containing a polymerization catalyst, preferably in the presence of an inert gas. The catalyst vessel (12) is connected to a catalyst injection tube (14) within a support tube (16). The catalyst injection tube (14) is for delivering the catalyst into a reactor vessel (18). The support tube (16) protrudes through a reactor wall (20), preferably into a reaction zone (22) within the reactor vessel (18). The polymerization catalyst, and in one embodiment the supported bulky ligand metallocene-type catalyst compound, is introduced into the catalyst injection tube (14) and the liquid diluent is injected into the support tube (16) through a line (24). The antistatic agent is introduced into line (24) through another line (26) that leads into line (24). In one embodiment of the invention the catalyst injection tube (14) is recessed from the end of the support tube (16) to allow contact of the supported catalyst system with a carrier solution (antistatic agent and liquid diluent) prior to the supported catalyst system exits the support tube (16). The catalyst injection tube (14) may be recessed about 2.5 inches (6.4 cm) inward from the end of the support tube (16). The supported catalyst system is introduced with a gas, preferably an inert gas such as nitrogen, to the catalyst injection tube (14) from a typical catalyst vessel (12), particularly a dry catalyst feeder vessel. Non-limiting example of a catalyst feeder is described in U.S. Pat. No. 3,779,712, which is fully incorporated herein by reference.

In another embodiment of the invention a catalyst feeder mechanism specifically used in a slurry polymerization process is utilized. Such a catalyst slurry feeder can be adapted similarly to the above by those of skill in the art.

In an embodiment of the invention the contact time of the supported bulky ligand metallocene-type catalyst system with the carrier solution prior to the supported bulky ligand metallocene catalyst system entering the polymerization zone in the reactor is in the range of from several days to less than a few seconds to less than one second, preferably less than 1 hour, more preferably less than 1 minute, even more preferably less than 30 seconds, still even more preferably less than 15 seconds, and most preferably less than about 2 seconds.

Polymerization Process

The bulky ligand metallocene-type catalyst compounds and catalyst systems of the invention described above are suitable for use in any polymerization process. The polymerization process of the invention includes a solution, gas or slurry process (including a high pressure process) or a combination thereof, more preferably a gas or slurry phase process.

In an embodiment, this invention is directed toward the solution, slurry or gas phase polymerization or copolymerization reactions involving the polymerization of one or more of the olefin monomer(s) having from 2 to 30 carbon atoms, preferably 2 to 12 carbon atoms, and more preferably 2 to 8 carbon atoms. The invention is particularly well suited to the copolymerization reactions involving the polymerization of one or more olefin monomers of ethylene, propylene, butene-1, pentene-1, 4-methyl-pentene-1, hexene-1, octene-1, decene-1, and cyclic olefins or a combination thereof. Other monomers can include vinyl monomers, diolefins such as dienes, polyenes, norbornene, norbornadiene monomers. Preferably a copolymer of ethylene is produced, where the comonomer is at least one alpha-olefin having from 4 to 15 carbon atoms, preferably from 4 to 12 carbon atoms, and most preferably from 4 to 8 carbon atoms.

In another embodiment ethylene or propylene is polymerized with at least two different comonomers to form a terpolymer; the preferred comonomers are a combination of alpha-olefin monomers having 4 to 10 carbon atoms, more preferably 4 to 8 carbon atoms, optionally with at least one diene monomer. The preferred terpolymers include the combinations such as ethylenelbutene-1/hexene-1, ethylene/propylene/butene-1, propylene/ethylene/hexene-1, ethylene/propylene/norbornene and the like.

In the most preferred embodiment the process of the invention relates to the polymerization of ethylene and at least one comonomer having from 4 to 8 carbon atoms in the presence of a bulky ligand metallocene-type catalyst compound and an activator supported on a carrier. Particularly, the comonomers are butene-1, 4-methyl-pentene-1, hexene-1 and octene-1, the most preferred being hexene-1.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A- 0 794 200, EP-A- 0 802 202 and EP-B- 634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540

Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060 and 5,589,555, which are fully incorporated herein by reference A preferred process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

It has been discovered that a polymerization process utilizing the catalyst delivery method of the invention may be operated with a small amount of scavenger with reduced or no effect on process operability and catalyst performance. Thus, in one embodiment, the invention provides a process for polymerizing olefin(s) in a reactor in the presence of a supported bulky ligand metallocene-type catalyst system and a scavenger to produce a polymer product, wherein the supported bulky ligand metallocene-type catalyst system is introduced to the reactor by a carrier solution, the carrier solution comprising an antistatic agent and a liquid diluent.

It has also been discovered that using the catalyst delivery method of the invention it is easier to produce fractional melt index and higher density polymers. In one embodiment the invention provides a process for polymerizing olefin(s) in a reactor in the presence of a supported bulky ligand metallocene-type catalyst system to produce a polymer product, wherein the supported bulky ligand metallocene-type catalyst system is introduced to the reactor by a carrier solution, and optionally with an inert gas, the carrier solution comprising an antistatic agent and a liquid diluent and the polymer product has a melt index less than about 1 dg/min and a density greater than 0.920 g/cc, more preferably the polymer product has a melt index less than about 0.75 dg/min and a density greater than 0.925 g/cc.

Polymer Product of the Invention

The polymers produced by the process of the invention can be used in a wide variety of products and end-use applications. The polymers typically have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc.

The polymers of the invention typically have a narrow molecular weight distribution, a weight average molecular weight to number average molecular weight ($M_w/M_n$) of greater than 1.5 to about 10, particularly greater than 2 to about 8, more preferably greater than about 2.2 to less than 8.

Also, the polymers of the invention typically have a narrow composition distribution as measured by Composition Distribution Breadth Index (CDBI). Further details of determining the CDBI of a copolymer are known to those skilled in the art. See, for example, PCT Pat. Application WO 93/03093, published Feb. 18, 1993 which is fully incorporated herein by reference.

The polymers of the invention in one embodiment have CDBI's generally in the range of greater than 50% to 99%, preferably in the range of 55% to 85%, and more preferably 60% to 80%, even more preferably greater than 60%, still even more preferably greater than 65%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in one embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65.

Polymers produced by the process of the invention are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

The properties of the polymer were determined by the following test methods:

Density is measured in accordance with ASTM-D-1238.

MWD, or polydispersity, is a well-known characteristic of polymers. MWD is generally described as the ratio of the weight average molecular weight (Mw) to the number average molecular weight (Mn). The ratio of Mw/Mn can be measured by gel permeation chromatography techniques well known in the art.

Example 1

Preparation of Catalyst A

Davison grade 948 silica (available from W.R. Grace, Davison Chemical Division, Baltimore, Md.) was dehydrated to 600° C. and used as the support. The dehydrated silica (850 g) was charged into a 2 gal. reactor and 1060 ml of 30 wt % methylalumoxane (MAO) (available from Albemarle Corporation, Baton Rouge, La.) was added with slow agitation. Toluene (2000 ml) was then charged to the reactor and the mixture was allowed to stir at 150° F. (66° C.) for 4 hours. Following the MAO reaction time, 23 grams of bis-(1,3-methyl-n-butyl cyclopentadienyl) zirconium dichloride was added as a 10 wt % solution in toluene. Reaction time for the bulky ligand metallocene-type catalyst compound was 1 hour after which the catalyst system was dried with $N_2$ under a vacuum. Drying time was 3 hours at 150° F. (66° C.) and at a reduced agitator speed of 30 rpm. A total of 1200 grams of dried free flowing catalyst was isolated.

Example 2
Preparation of Catalyst B

Into a 10 gal. reactor was added 23 liters of a 15 wt % trimethylaluminum (TMA) solution in heptane. While agitating the solution, 4.2 kg of silica (Davison 948 grade available from W.R. Grace, Davison Chemical Division, Baltimore, Md.) was added slowly. The silica had a measured loss-on-ignition (LOI) of 12.5 wt % (LOI can be measured by determining the weight loss of the support material which has been held at temperature of about 1000° C. for about 16 hours) and was added via a dip tube slowly to prevent the reaction temperature from going above 50° F. (10° C.). After all of the silica was added, 94.5 g of the bulky ligand metallocene-type catalyst compound, bis(1,3-methyl n-butyl cyclopentadienyl) zirconium dichloride, was added as a 10 wt % solution in heptane. The mixture was then allowed to react while stirring for 1 hour at 150° F. (66° C.) after which the agitation was stopped; the slurry was allowed to settle and the liquid layer was removed by decanting. Four hexane washes were then carried out by introducing 20 liters of hexane each time, stirring, allowing the solids to settle and decanting. Drying of the catalyst was then initiated with $N_2$ flow at 150° F. (66° C.) with slow intermittent agitation until the catalyst was free flowing.

Example 3
Preparation of Catalyst C

Into a 2 gallon reactor was charged first with 2.0 liters of toluene then 1060 g of 30 wt % MAO solution in toluene (available from Albemarle), followed by 23.1 g of bis(1,3-methyl-n-butyl cyclopentadienyl) zirconium dichloride as a 10% solution in toluene. The mixture was stirred for 60 minutes at room temperature after which 850 g of silica (Davison 948 dehydrated at 600° C.) was added to the liquid with slow agitation. Stirring speed was increased for approximately 10 minutes to insure dispersion of the silica into the liquid and then appropriate amount of toluene was added to make up a slurry of liquid to solid having a consistency of 4 cc/g of silica. Mixing was continued for 15 minutes at 120 rpm after which 6 g of surface modifier, Kemamine AS-990 (available Witco Corporation, Memphis, Tenn.) was dissolved in 100 cc of toluene and was added and stirred for 15 minutes. Drying was then initiated by vacuum and some $N_2$ purge at 175° F. (79.4° C.). When the catalyst appeared to be free flowing it was cooled down and discharged into a nitrogen purged vessel. An approximate yield of 1.0 kg of dry catalyst was obtained.

Polymerization Process

Into a 2 liter autoclave reactor under a nitrogen purge was charged with triethylaluminum (TEAL), followed by 60 cc of hexene-1 comonomer and 800 cc of isobutane diluent. The content of the reactor was heated to 80° C. after which, separately, 100 mg of the supported catalysts above Catalyst A, B and C was coinjected with a carrier solution having the indicated amount of antistatic agent, Kemamine AS-990, as in Table 1. The supported catalyst and carrier solution was introduced concurrently with ethylene to make up a total reactor pressure of 325 psig (2240 kPa). The reactor temperature was maintained at 85° C. and the polymerization was allowed to proceed for 40 min. After 40 minutes the reactor was cooled, ethylene was vented off and the polymer dried and weighed to obtain the polymer yield Table 1 provides the yield and activity data using metallocene catalyst with different levels of coinjected Kemamine AS-990.

TABLE 1

| Example | Catalyst | AS-990 Amount[1] | Activity (g/PE/gCat · h) | Fouling |
|---|---|---|---|---|
| 4 | A | None | 1725 | Medium |
| 5 | B | 3 wt % | 1830 | None |
| 6 | C | 5 wt % | 1560 | None |

[1]Amount based on the total weight of the supported catalyst.

The above examples in Table 1 illustrate the use in combination of Kemamine AS-990 containing carrier solution with the supported bulky ligand metallocene-type catalyst systems prior to polymerization. The data shows that the carrier solution did not have a negative effect on activity, and reactor fouling was virtually eliminated.

Examples 7–12, in Table 2, show the effect on the performance of Catalyst B when using carrier solutions containing the antistatic agents Kemamine AS-990 and Kemamine AS-650.

TABLE 2

| Example | Antistatic Agent | Amount (wt %) | Activity (g/PE/gCat · h) | Fouling |
|---|---|---|---|---|
| 7 | None | 0 | 1200 | High |
| 8 | AS990 | 3 | 1440 | None |
| 9 | AS990 | 3 | 1545 | None |
| 10 | None | 0 | 1170 | High |
| 11 | AS650 | 2.5 | 1470 | None |
| 12 | AS650 | 2.5 | 1410 | None |

The above examples 7–12 of Table 2 illustrate that carrier solutions containing Kemamine AS-650 and Kemamine AS-990 have a beneficial effect on reactor operability.

Examples 13–17 in Table 3 illustrate the effect of a carrier solution containing Kemamine AS-990 on Catalyst C performance in the presence of different alkyl scavengers, specifically tri-ethylaluminum (TEAL) and triisobutylaluminum (TIBAL).

TABLE 3

| Example | Scavenger | Antistatic Agent (wt %) | Activity (g/PE/gCat · h) | Fouling |
|---|---|---|---|---|
| 13 | TEAL | 0 | 1950 | Low |
| 14 | TEAL | 2 | 1695 | None |
| 15 | TIBAL | 0 | 2640 | Medium |
| 16 | TIBAL | 2 | 2430 | None |
| 17 | TIBAL | 4 | 2295 | None |

The results in Table 3 illustrate that even in the presence of scavengers such as aluminum alkyls that typically increase the level of fouling as seen in Examples 13 and 15, the coinjection of the bulky ligand metallocene-type catalyst system with a carrier solution eliminates the fouling/sheeting tendency of the supported bulky ligand metallocene-type catalyst system.

Example 18
Preparation of Catalyst D

The bulky ligand metallocene-type catalyst compound used in this Example 18 is a dimethylsilyl-bis (tetrahydroindenyl)zirconium dichloride ($Me_2Si(H_4Ind)_2ZrCl_2$) available from Albemarle Corporation, Baton Rouge, La. The ($Me_2Si(H_4Ind)_2ZrCl_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England.

The first step in the manufacture of the supported metallocene-type catalyst above involves forming a precursor solution. 460 lbs (209 kg) of sparged and dried toluene is added to an agitated reactor after which 1060 lbs (482 kg) of a 30 weight percent methylaluminoxane (Albemarle Corp., Baton Rouge, La.) is added. 947 lbs (430 kg) of a 2 weight percent toluene solution of a dimethylsilyl-bis (tetahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour.

While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl) octadecylamine (($C_{18}H_{37}N(CH_2CH_2OH)_2$) available as Kemamine AS-990 Witco Corporation, Memphis, Tenn., is added together with an additional 110 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0.

Polymerization Process

The catalyst system of Examples 18 was then tested in a continuous gas phase fluidized bed reactor which comprised a nominal 18 inch, schedule 60 reactor having an internal diameter of 16.5 inches. The fluidized bed is made up of polymer granules. The gaseous feed streams of ethylene and hydrogen together with liquid comonomer were mixed together in a mixing tee arrangement and introduced below the reactor bed into the recycle gas line. Hexene-1 was used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream. The solid supported bulky ligand metallocene-type catalyst system was injected directly into the fluidized bed using purified nitrogen at 1.5 lbs/hr (0.68 kg/hr). Additionally, a carrier solution, a 2000 ppm Kemamine AS-990 solution in hexane, was fed into the catalyst addition probe (catalyst injection tube) in a location close to the reactor inlet and in another location further back from the reactor inlet. In one case, a small hexane (1.5 lbs/hr(0.68 Kg/hr)) and nitrogen (3 lbs/hr(1.36 Kg/hr)) flow were maintained to flush the catalyst through the ⅛ inch (0.32 cm) probe. In another case, only the nitrogen was added in addition to the Kemamine AS-990 solution fed to the catalyst probe and the rate of nitrogen was limited to 1.5 lbs/hr (0.68 Kg/hr). The probe location was varied from the standard location which is approximately 26 inches (66 cm) above the product discharge port to a site approximately 40 inches (102 cm) above the product discharge port. (See FIG. 1) The reacting bed of growing polymer particles is maintained in a fluidized state by the continuous flow of the make up feed and recycle gas through the reaction zone. A superficial gas velocity of 1–3 ft/sec (30.5 cm/sec to 91.4 cm/sec) was used to achieve this. The reactor was operated at a total pressure of 300 psig (2069 kPa) and a superficial gas velocity of 2.25 ft/sec (68.6 cm/sec) was used to achieve fluidization of the granules. To maintain a constant reactor temperature, the temperature of the recycle gas is continuously adjusted up or down to accommodate any changes in the rate of heat generation due to the polymerization. The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst.

The polymerization conditions for polymerization utilizing the catalyst system of Example 18 and results are set forth in Table 4 below. The carrier solution, Kemamine AS-990 was fed as a 2000 ppm solution in hexane. The Kemamine AS-990 containing solution was fed using a delivery meter into the catalyst probe which had no annular flush. Kemamine AS-990 flow was regulated to 300 cc/hr and then raised to 400 cc/hr during the test. The resulting concentration of Kemamine AS-990 on a catalyst basis was 3.8 wt % Kemamine AS-990 g/g solid catalyst. On a polymer basis, this was 8 ppm on a gram Kemamine AS-990/g polymer basis. The location to which carrier solution, the Kemamine AS-990 and hexane, was added to the catalyst probe is approximately 4 ft (122 cm) from the reactor.

TABLE 4

| Examples | Example 18 |
|---|---|
| Catalyst | Catalyst D |
| Temperature (° F.) (° C.) | 185 (85) |
| Pressure (psi) (kPa) | 300 (2069) |
| $C_2$ Partial Pressure (psia) (kpa) | 205 (1414) |
| Ethylene (mole %) | 70 |
| Hydrogen (mole ppm) | 765 |
| Hydrogen/Ethylene Conc. ratio | 10.93 |
| Hexene (mole %) | 0.63 |
| Hexene/Ethylene Conc. ratio | 0.009 |
| Bed Weight (lbs) (Kg) | 600 (273) |
| Residence Time (hrs) | 3.7 |
| Gas Velocity (ft/sec) (cm/sec) | 2.25 (68.6) |
| Production Rate (lbs/hr) (Kg/Hr) | 160 (72.7) |
| Bulk Density (g/cc) | 0.48 |

TABLE 6

| EXAMPLE | 19 | 20 | 21 | 22 |
|---|---|---|---|---|
| Start Date | 11/6 | 11/10 | 1/10 | 1/16 |
| End Date | 11/18 | 11/17 | 1/15 | 1/16 |
| BTO's | 73 | 39 | 30.4 | 2.7 |
| Catalyst | D | D | D | D |
| Cat. Activity (lbs PE/lb cat) | 6300 | 6100 | 4995 | 4830 |
| MI (dg/min) | 1.94 | 1.99 | 1.42 | 1.47 |
| Density (g/cc) | 0.9197 | 0.9210 | 0.9194 | 0.9188 |
| Resin bulk density (g/cc) | 0.48 | 0.48 | 0.46 | 0.48 |
| AS-990 Carrier solution | Yes | Yes | Yes | No |

Examples 19 and 20 of Table 6 using the delivery method of the invention resulted in extended polymerization runs of 73 and 39 bed turnovers, respectively. Examples 21 and 22 was one continuous run in the same reactor. As you can see from the data using the method of delivery of the invention with Catalyst D in this example resulted in about 30 bed turnovers (Example 21) and when using the same catalyst at similar process conditions without coinjection of a carrier solution, after only about 2.7 bed turnovers the reactor had to be shut-down due to fouling and sheeting (Example 22).

While the present invention has been described and illustrated by reference to particular embodiments, those of ordinary skill in the art will appreciate that the invention lends itself to variations not necessarily illustrated herein. For example, it is contemplated that an antistatic agent can be added to reactor in addition to being used in a carrier solution. It is also contemplated that the delivery method of the invention can be used in a series reactor process. The delivery method and catalyst feeder may be used with conventional Ziegler-Natta or Phillips-type catalysts in gas phase or slurry phase. For this reason, then, reference should be made solely to the appended claims for purposes of determining the true scope of the present invention.

We claim:

1. A method for delivering a supported bulky ligand metallocene catalyst system to a gas or slurry phase polymerization reactor comprising contacting the metallocene catalyst system in a carrier solution at a temperature above 50° C., said carrier solution comprising an antistatic agent and a liquid diluent, and flushing the supported bulky ligand metallocene catalyst system into the reactor.

2. The method of claim 1 wherein the antistatic agent is a hydroxy containing alkyl tertiary amine.

3. The method of claim 1 wherein the time of contact is less than one minute prior to the supported bulky ligand metallocene catalyst system is flushed into the reactor.

4. The method of claim 1 wherein the liquid diluent is one or more of the group consisting of an olefin having from 2 to 20 carbon atoms and a non-polymerizable saturated or unsaturated hydrocarbon.

5. The method of claim 1 wherein the carrier solution and a gas serve to flush the supported bulky ligand metallocene catalyst system into the reactor.

6. The method of claim 1 wherein the carrier solution comprises about 0.1 to 5 weight percent of the antistatic agent based on the total weight of the carrier solution.

7. The method of claim 3 wherein the carrier solution is flushed intermittently with the supported bulky ligand metallocene catalyst system into the reactor.

8. The method of claim 1 wherein the antistatic agent in the carrier solution is present in amount from about 2 to about 10 weight percent based on the total weight of the supported bulky ligand metallocene catalyst system flushed into the reactor at any given time.

9. The method of claim 1 wherein the carrier solution and the supported bulky ligand metallocene catalyst system are flushed through a catalyst injection tube into the reactor.

10. The method of claim 3 wherein the carrier solution and the supported bulky ligand metallocene catalyst system are flushed continuously through a catalyst injection tube into the reactor.

11. The method of claim 1 wherein the reactor is producing greater than 500 lbs (227 Kg) of polymer per hour.

12. The method of claim 1 wherein reactor is a gas phase reactor having a fluidized bed having a bed weight wherein the carrier solution contains a sufficient amount of an antistatic agent to yield in the range of from 2 to 50 ppm of the antistatic agent based on the bed weight in the reactor.

13. A gas or slurry phase process for polymerizing olefin(s) in a reactor in the presence of a supported bulky ligand metallocene catalyst system, wherein the supported bulky ligand metallocene catalyst system is introduced to the reactor by a carrier solution, the carrier solution comprising an antistatic agent and a liquid diluent and wherein the metallocene catalyst system is contacted with the carrier solution at a temperature above 50° C.

14. The process of claim 13 wherein the process is a gas phase process and the reactor is a fluidized bed reactor.

15. The process of claim 13 wherein the carrier solution comprises about 0.1 to 10 weight percent of the antistatic agent based on the total weight of the carrier solution.

16. The process of claim 13 wherein the carrier solution and the supported bulky ligand metallocene catalyst system contact each other for less than about one minute prior to entering the reactor.

17. The process of claim 13 wherein the carrier solution and a gas are used to introduce the supported bulky ligand metallocene catalyst into the reactor.

18. The process of claim 16 wherein the carrier solution is introduced into the reactor continuously with the supported bulky ligand metallocene catalyst system through an catalyst injection tube into the reactor.

19. The process of claim 13 wherein the process is producing a polymer product having a melt index less than 1 dg/min and a density greater than 0.920 g/cc.

20. The process of claim 19 wherein the polymer product comprises less than 10 ppm of the antistatic agent and the process is producing greater than 500 lbs (227 Kg) of polymer per hour.

21. The process of claim 13 wherein the process further comprises introducing a scavenger to the reactor.

22. A continuous gas phase process for polymerizing monomer(s) in a reactor, said process comprising the steps of:
   a) introducing a recycle stream into the reactor, the recycle stream comprising one or more monomer(s) and;
   b) introducing a supported bulky ligand transition metal metallocene catalyst system contacted with a carrier solution and wherein the metallocene catalyst system is contacted with the carrier solution at a temperature above 50° C., the carrier solution comprising an antistatic agent and a liquid diluent, into the reactor;
   c) withdrawing the recycle stream from the reactor;
   d) cooling the recycle stream;
   e) introducing into the reactor additional monomer and additional comonomer to replace the one or more monomer(s) polymerized;
   f) reintroducing the recycle stream into the reactor; and
   g) withdrawing a polymer product from the reactor.

23. The process of claim 22 wherein the antistatic agent is an alkoxylated tertiary amine.

24. The process of claim 22 wherein the carrier solution comprises about 0.1 to 5 weight percent of the antistatic agent based on the total weight of the carrier solution.

25. The process of claim 22 wherein the polymer product comprises less than 10 ppm of the antistatic agent.

26. The process of claim 22 wherein the process is producing a polymer product having a melt index less than 1 dg/min and a density greater than 0.920 g/cc.

27. The process of claim 22 wherein the process is producing a polymer product having a melt index less than 0.75 dg/min and a density greater than 0.925 g/cc.

28. The process of claim 22 wherein the process further comprises the step of introducing a scavenger.

29. The process of claim 22 wherein the carrier solution and the supported bulky ligand metallocene catalyst system contact each other for less than about 1 minute prior to being introduced to the reactor.

30. The process of claim 29 wherein the supported bulky ligand transition metal metallocene catalyst system contacted and carrier solution are introduced into the reactor intermittently.

31. The process of claim 22 wherein the supported bulky ligand transition metal metallocene catalyst system is introduced into the reactor with the carrier solution upon start-up or until the desired catalyst productivity, polymer density or melt index are achieved, thereafter the introduction of the carrier solution is halted and the supported bulky ligand transition metal metallocene catalyst system is introduced into the reactor by an inert gas.

32. The process of claim 1 wherein the polymer product is withdrawn at a rate greater than 500 lbs (227 Kg) of polymer product per hour.

33. The process of claim 22 wherein the supported bulky ligand metallocene catalyst system and the carrier solution are introduced to the reactor through a catalyst feeder tube.

34. The process of claim 22 wherein the process is operating where the recycle stream is divided into a gas phase and a liquid phase.

35. The process of claim 22 wherein the supported bulky ligand metallocene catalyst system is a supported bridged bulky ligand metallocene catalyst system.

36. The process of claim 22 wherein the time of contact between the supported bulky ligand metallocene catalyst system and the carrier solution is less than about 2 seconds prior to the supported bulky ligand metallocene catalyst system and carrier solution are introduced into the reactor.

37. A continuous gas phase fluidized bed process for polymerizing olefins(s) in the presence of a supported bulky ligand metallocene catalyst system in a reactor vessel, the supported bulky ligand metallocene catalyst system contacted with a carrier solution at a temperature above 50° C., said carrier solution comprising an antistatic agent and wherein the metallocene containing solution is introduced into the reactor vessel through a catalyst injection tube, wherein the process comprises the step of withdrawing greater than 500 lbs. (227 Kg) of a polymer product per hour, the polymer product having a melt index less than 1 dg/min, a density greater than 0.920 g/cc and containing less than 10 ppm of the antistatic agent.

38. The process of claim 37 wherein the polymer product has a melt index less than 1 dg/min and a density greater than 0.925 g/cc.

39. The process of claim 38 wherein the process comprises the step of withdrawing greater than 25,000 lbs (90,900 Kg) of polymer product per hour.

40. The process of claim 37 wherein the polymer product has an $I_{21}/I_2$ of greater than 30, and a density greater than 0.910 g/cc.

41. A continuous process for polymerizing olefins(s) in the presence of a polymerization catalyst composition in a reaction zone within a polymerization reactor, the polymerization catalyst composition comprising a supported bulky ligand metallocene catalyst system and a carrier solution comprising an antistatic agent and a liquid diluent, wherein the supported bulky ligand metallocene catalyst system contacts the carrier solution for less than one minute prior to the polymerization catalyst composition entering the reaction zone.

42. The process of claim 41 wherein the supported bulky ligand metallocene catalyst system contacts the carrier solution for less than 30 seconds prior to the polymerization catalyst composition entering the reaction zone.

43. The process of claim 41 wherein the supported bulky ligand metallocene catalyst system contacts the carrier solution for less than two seconds prior to the polymerization catalyst composition entering the reaction zone.

44. The process of claim 41 wherein the supported bulky ligand metallocene catalyst system contacts the carrier solution intermittently.

45. The process of claim 41 wherein the process is a gas phase process and the polymerization reactor is a fluidized bed reactor.

46. The process of claim 41 wherein the polymerization catalyst composition enters the reaction zone through a catalyst injection tube and the process is producing greater than 500 lbs (227 Kg) of a polymer product per hour.

47. The process of claim 41 wherein the process is producing greater than 1000 lbs (455 Kg) of a polymer product per hour.

48. The process of claim 41 wherein the process is producing greater than 10,000 lbs (4540 Kg) of a polymer product per hour.

49. The process of claim 41 wherein the process is producing greater than 25,000 lbs (11,300 Kg) of a polymer product per hour.

50. The process of claim 48 wherein the polymer product has a density greater than 0.900 g/cc.

51. The process of claim 49 wherein the polymer product has a density greater than 0.920 g/cc.

52. The process of claim 51 wherein the polymer product has a melt index less than 1 dg/min.

53. The process of claim 48 wherein the polymer product has a density greater than 0.925 g/cc and a melt index less than 0.75 dg/min.

54. The process of claim 53 wherein the polymer product has an $I_{21}/I_2$ greater than 30.

55. The process of claim 49 wherein the polymer product has a density greater than 0.925 g/cc and the $I_{21}/I_2$ is greater than 60.

56. The process of claim 41 wherein the process is producing greater than 50,000 lbs (22,700 Kg) of a polymer product per hour and the polymer product having a density greater than 0.920 g/cc and a $I_{21}/I_2$ greater than 40.

* * * * *